Aug. 22, 1944.   R. S. POTTER ET AL   2,356,694
OPTICAL FILTER AND METHOD OF PRODUCING SAME
Filed March 15, 1943
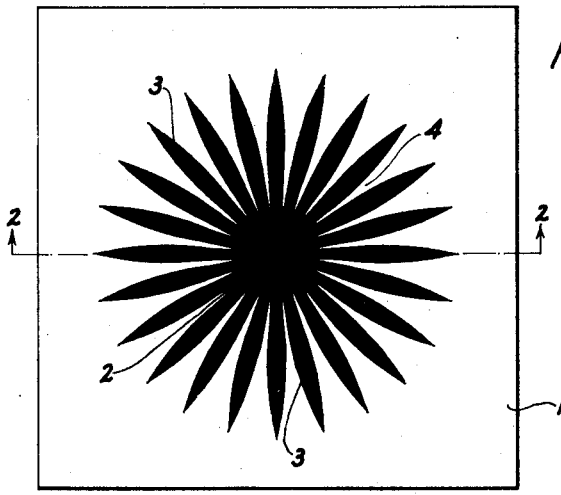
Fig. 1
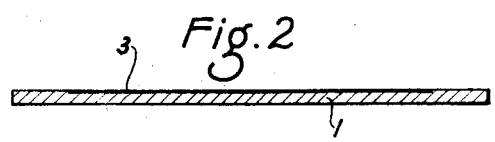
Fig. 2
Fig. 3
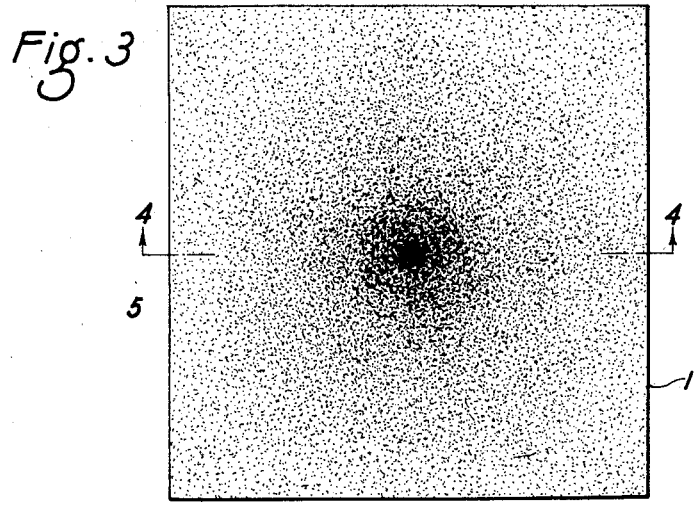
Fig. 4
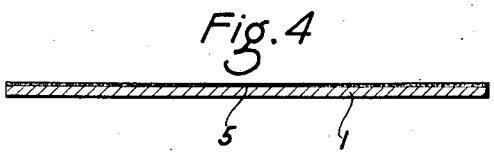
Rowland S. Potter
John M. Centa
INVENTORS
BY Harold E. Stonebraker
ATTORNEY.

Patented Aug. 22, 1944

2,356,694

UNITED STATES PATENT OFFICE 2,356,694

OPTICAL FILTER AND METHOD OF PRODUCING SAME

Rowland S. Potter, Brightford Heights, and John M. Centa, Rochester, N. Y., assignors to Defender Photo Supply Co., Inc., Rochester, N. Y., a corporation of New York Application March 15, 1943, Serial No. 479,170

2 Claims. (Cl. 95—81)

This invention relates to an optical filter and method of producing the same, and has for one object to afford a light modulating filter that can be easily manufactured at a relatively low cost from a gelatin or other proteinaceous or suitable layer, and will embody any selected predetermined light modulating pattern affording varying densities at different portions of the filter.

Reduced light transmission through a lens is usually effected by means of a uniform neutral density filter. However, it has been found that a similar reduction of transmission can be obtained by using a filter having areas of different densities and possessing the same average overall transmission factor.

Certain lenses, for instance, those used in aerial photography and for other purposes have an extreme curvature which results in wide variations in exposure between the central and edge portions of the negative, the center being overexposed while the surrounding areas of the negative are progressively underexposed, and it is a particular purpose of the invention to afford a low cost filter that can be readily produced and will operate successfully with such a lens so as to obtain uniform exposure over all parts of the negative.

Optical filters such as used heretofore for this purpose have been constructed by incorporating the light-controlling material into a molten mass from which the filter is made and casting the latter in a mold the shape of which imparts varying thicknesses to the filter at different portions, and these varying thicknesses result in different densities. This method is slow and costly, necessitating a separate mold for each different gradation requirement of filter. It is therefore a further purpose of the invention to afford an optical filter of uniform thickness and of varying densities and colors at different portions thereof, the filter being adapted to have formed as a permanent, integral part any one of an infinite number of different patterns so as to afford any desired relation of varying densities and colors at different portions of the filter layer.

Another purpose of the invention is to afford an optical filter made of gelatin or other suitable material that enables transferring on to the filter layer a predetermined pattern in any desired color and conforming to a predetermined pattern. This may be produced by photographing the pattern or a drawing on to a negative or by exposing a negative through a gradually closed aperture, thus obtaining on the negative the desired pattern which is reproduced on a light-sensitive layer to produce a relief image and transferred thence to the gelatin or other filter layer by a dye-transfer process.

To these and other ends, the invention consists in the arrangement and procedure that will appear clearly from the following description when read in conjunction with the accompanying drawing, the novel features being pointed out in the claims following the specification.

In the drawing:

Fig. 1 is a plan view of one practical embodiment of the invention;

Fig. 2 is a sectional view on the line 2—2 of Fig. 1;

Fig. 3 is a plan view of a modified form of the invention, and

Fig. 4 is a sectional view on the line 4—4 of Fig. 3.

The invention may be carried out in a variety of ways, and while the present disclosure is illustrative of different possible practical adaptations, it is not intended to limit the invention to the specific structures illustrated and described.

Referring more particularly to the drawing, and to Figs. 1 and 2, 1 designates a clear transparent gelatin or proteinaceous or other suitable layer of uniform thickness throughout and provided with a pattern in neutral gray of any desired density, or any desired color. The pattern illustrated includes both a central area 2 and radially arranged tapering areas 3 of predetermined density, the latter being separated by the intermediate areas 4 of transparent gelatin or otherwise of different color or density from the areas 2 and 3. This example affords a central area of predetermined density and surrounding radiating areas of the same density progressively decreasing in size toward the edge of the filter.

When such a filter is mounted in front of a wide angle lens, it is possible to obtain a negative having an even, uniform exposure over its entire area, the radially tapering dense areas permitting progressively greater light transmission as the edge of the filter is approached.

Such a filter can be produced in different ways, as for instance by making a drawing of the pattern which it is desired to provide on the filter. The drawing or pattern is photographed and the negative thus obtained with the pattern thereon is used to produce a gelatin relief matrix by any of the methods well known in the art.

This relief image or matrix is then bathed in a suitable dye and the dyed relief image is then pressed firmly against a transparent layer of any dye-absorbing material, such as gelatin, having satisfactory dye-absorbing characteristics and constituting the filter. The dye is thus absorbed by the gelatin of the filter and becomes permanently incorporated as an integral part of the filter. Any dye transfer process may be used that is suitable for transferring the image by imbibition to the filter layer, and the dye-absorbing layer of which the filter is formed may be colorless, or may itself be dyed during manufacture so as to obtain further light modulating effects in addition to the varying densities resulting from the pattern transferred by the dye image as previously described.

Figs. 3 and 4 show a modified form of the invention in which the dye is applied over the entire area of the filter layer, the central area 5 being of maximum density and the surrounding area to the edge of the filter being of progressively decreasing density. This effect is obtainable by exposing the negative in the first instance to light through an aperture that is decreased in size gradually so that the outer portions of the negative are exposed to considerably less light than the central area thereof. Then a relief image or matrix is produced as heretofore described. The relief image is then bathed in a suitable dye and printed in the same manner as already described. The dye image thus transferred to the filter layer results in the latter having an area of greatest density at its center, and surrounding areas of progressively decreasing density toward the edges.

Other methods may be utilized, such as printing with suitable inks, to obtain the pattern from which the relief image is produced, and while the invention has been disclosed with reference to certain specific structures and procedures, it is not limited to the details herein disclosed, and this application is intended to cover such modifications or changes in the structure and method as may come within the purposes of the improvement or the scope of the following claims.

We claim:

1. A photographic filter having a uniform index of refraction throughout and comprising a continuous, single layer that is transparent throughout and of uniform thickness at its center and edge portions, said layer containing as an integral part on one surface thereof a pattern of less area than the filter, said pattern being transparent throughout and comprising a circular central portion and outwardly tapering symmetrically arranged portions radiating in all directions from said central portion and separated from each other by inwardly tapering spaces of less density than the pattern area, said circular central portion and outwardly tapering radiating portions of the pattern being of uniform density throughout and of greater density than the remaining area of the filter whereby the filter is effective to obtain uniform exposure of a negative with a lens of extreme curvature.

2. A photographic filter having a uniform index of refraction throughout and comprising a continuous, single gelatin layer that is transparent throughout and of uniform thickness at its center and edge portions, said layer containing as an integral part on one surface thereof a dyed pattern of less area than the filter, said dyed pattern being transparent throughout and comprising a circular central portion and outwardly tapering symmetrically arranged portions radiating in all directions from said central portion and separated from each other by inwardly tapering undyed spaces of less density than the pattern area, said circular central portion and outwardly tapering radiating portions of the pattern being of uniform density throughout and of greater density than the remaining undyed area of the filter whereby the filter is effective to obtain uniform exposure of a negative with a lens of extreme curvature.

ROWLAND S. POTTER.
JOHN M. CENTA.